United States Patent
Caporal Del Barrio et al.

(10) Patent No.: US 12,245,213 B2
(45) Date of Patent: Mar. 4, 2025

(54) USER EQUIPMENT BEAM CORRESPONDENCE

(71) Applicant: NOKIA TECHNOLOGIES OY, Espoo (FI)

(72) Inventors: Samantha Caporal Del Barrio, Aalborg (DK); Simon Svendsen, Aalborg (DE); Johannes Harrebek, Aalborg (DK); Amir Mehdi Ahmadian Tehrani, Karlsfeld (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 518 days.

(21) Appl. No.: 17/474,782

(22) Filed: Sep. 14, 2021

(65) Prior Publication Data

US 2022/0124695 A1    Apr. 21, 2022

(30) Foreign Application Priority Data

Sep. 14, 2020   (FI) .................................... 20205882

(51) Int. Cl.
*H04W 72/044*   (2023.01)
*H04B 7/08*   (2006.01)
*H04L 5/00*   (2006.01)

(52) U.S. Cl.
CPC .......... *H04W 72/046* (2013.01); *H04B 7/088* (2013.01); *H04L 5/0048* (2013.01)

(58) Field of Classification Search
CPC .... H04W 72/046; H04W 16/28; H04B 7/088; H04B 7/06966; H04B 7/0617; H04B 7/0404; H04L 5/0048
See application file for complete search history.

(56) References Cited

U.S. PATENT DOCUMENTS

| | | | |
|---|---|---|---|
| 9,313,010 B2 | 4/2016 | Autti et al. | |
| 10,615,859 B2 | 4/2020 | Frenne et al. | |
| 2003/0228857 A1* | 12/2003 | Maeki | H04B 7/0695 455/278.1 |

(Continued)

FOREIGN PATENT DOCUMENTS

| | | |
|---|---|---|
| CN | 107408966 A | 11/2017 |
| CN | 110870219 A | 3/2020 |

(Continued)

OTHER PUBLICATIONS

"3rd Generation Partnership Project; Technical Specification Group Radio Access Network; NR; Physical Layer Procedures for Data (Release 16)", 3GPP TS 38.214 v16.2.0, (Jun. 2020), 163 pages.

(Continued)

*Primary Examiner* — Sun Jong Kim
(74) *Attorney, Agent, or Firm* — ALSTON & BIRD LLP (57) ABSTRACT

A method comprises: determining, at a user equipment, user equipment current operating conditions; identifying whether an antenna configuration for maintaining correspondence between user equipment transmission and reception beams is stored by the user equipment for the user equipment current operating conditions; and when the antenna configuration is identified, applying the antenna configuration for maintaining correspondence between the user equipment transmission and reception beams.

19 Claims, 7 Drawing Sheets

(56) References Cited

U.S. PATENT DOCUMENTS

| | | | |
|---|---|---|---|
| 2010/0231473 A1* | 9/2010 | Shtrom | H01Q 3/24 343/757 |
| 2012/0220238 A1* | 8/2012 | Hosoya | H04B 7/06 455/63.4 |
| 2014/0349637 A1* | 11/2014 | Hyde | H01Q 3/00 455/419 |
| 2017/0111852 A1* | 4/2017 | Selen | H04W 48/16 |
| 2018/0026683 A1 | 1/2018 | Manholm et al. | |
| 2018/0131434 A1 | 5/2018 | Islam et al. | |
| 2018/0269945 A1 | 9/2018 | Zhang et al. | |
| 2019/0021096 A1 | 1/2019 | Nilsson et al. | |
| 2019/0306875 A1* | 10/2019 | Zhou | H04B 7/0695 |
| 2020/0112890 A1* | 4/2020 | Luo | H04B 7/086 |
| 2021/0127379 A1 | 4/2021 | Harrebek et al. | |
| 2021/0258061 A1 | 8/2021 | Harrebek et al. | |
| 2023/0102698 A1 | 3/2023 | Cao | |

FOREIGN PATENT DOCUMENTS

| | | |
|---|---|---|
| CN | 110958042 A | 4/2020 |
| EP | 3567783 A1 | 11/2019 |
| WO | WO 2010/085722 A1 | 7/2010 |
| WO | WO 2017/067591 A1 | 4/2017 |
| WO | WO 2018/064348 A1 | 4/2018 |
| WO | WO 2018/204340 A1 | 11/2018 |
| WO | WO 2019/195528 A1 | 10/2019 |
| WO | WO 2020/020453 A1 | 1/2020 |
| WO | WO 2020/167201 A1 | 8/2020 |

OTHER PUBLICATIONS

"3rd Generation Partnership Project; Technical Specification Group Radio Access Network; Study on New Radio Access Technology Physical Layer Aspects (Release 14)", 3GPP TR 38.802 v14.2.0, (Sep. 2017), 144 pages.

"ETSI Technical Specification—5G; NR; User Equipment (UE) Radio Transmission and Reception; Part 2: Range 2 Standalone", 3GPP TS 38.101-2 version 15.5.0 Release 15, (May 2019), 147 pages.

Finland Patent Application No. 20205747, filed Jul. 10, 2020; In re: Nokia Technologies Oy, entitled "User Equipment Beam Reconfiguration Procedure Triggering", 26 pages.

Finland Patent Application No. 20205821, filed Aug. 24, 2020; In re: Nokia Technologies Oy, entitled "Beam Alignment in an Apparatus", 33 pages.

Intel Corporation, "On Beam Correspondence", 3GPP TSG-RAN WG1 #88, R1-1702198, (Feb. 13-17, 2017), 3 pages.

NTT Docomo, Inc., "Remaining Issues on Multi-Beam Operation", 3GPP TSG RAN WG1 Meeting #100-e, R1-2000926, (Feb. 24-Mar. 6, 2020), 10 pages.

Office Action for Finland Patent Application No. 20205882 dated Dec. 29, 2020, 7 pages.

Samsung, "Discussion on UL Beam Management", 3GPP TSG RAN WG1 Meeting #88bis, R1-1705341, (Apr. 3-7, 2017), 6 pages.

Samsung, "New WID: Further Enhancements on MIMO for NR", 3GPP TSG RAN Meeting #86, RP-193133, (Dec. 9-12, 2019), 5 pages.

Apple Inc., "TP to TR38.831: Beam Correspondence Enhancement", 3GPP RAN WG4 Meeting #96-e, R4-2011737, (Aug. 17-20, 2020), 12 pages.

Extended European Search Report for European Application No. 21195024.1 dated Feb. 16, 2022, 11 pages.

Huawei et al., "New FR2 FWA UE RF Requirement", 3GPP TSG-RAN4 WG4 Meeting #95-e, R4-2008175, (May 25-Jun. 5, 2020), 7 pages.

Office Action for Chinese Application No. 202111076616.3 dated Nov. 28, 2023, 11 pages.

Office Action for Chinese Application No. 202111076616.3 dated Jun. 21, 2024, 10 pages.

Office Action for European Application No. 21195024.1 dated Jul. 30, 2024, 4 pages.

Office Action for Chinese Application No. 202111076616.3 dated Sep. 9, 2024, 9 pages.

* cited by examiner

USER EQUIPMENT BEAM CORRESPONDENCE

CROSS-REFERENCE TO RELATED APPLICATIONS

This application claims priority to Finnish Application No. 20205882, filed Sep. 14, 2020, the entire contents of which are incorporated herein by reference.

TECHNOLOGICAL FIELD

Various example embodiments relate to a method, computer program and apparatus for maintaining user equipment (UE) beam correspondence.

BACKGROUND

In a wireless telecommunications network, such as a 5G network, uplink and downlink beams are formed between user equipment and a network node to support communication between the user equipment and the network node. Although techniques exist for configuring those uplink and downlink beams, poor communication performance between the user equipment and the network node can occur. Accordingly, it is desired to provide an improved technique for supporting communication between the user equipment and the network node.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, embodiments of the invention there is provided a method, comprising: determining, at a user equipment, user equipment current operating conditions; identifying whether an antenna configuration for maintaining correspondence between user equipment transmission and reception beams is stored by the user equipment for the user equipment current operating conditions; and when the antenna configuration is identified, applying the antenna configuration for maintaining correspondence between the user equipment transmission and reception beams.

The method may comprise when no antenna configuration is identified, signalling that a reference signal sweep procedure is required to identify an antenna configuration for maintaining correspondence between user equipment transmission and reception beams for the user equipment current operating conditions.

The method may comprise when no antenna configuration is identified, performing a reference signal sweep procedure to identify an antenna configuration for maintaining correspondence between user equipment transmission and reception beams for the user equipment current operating conditions.

The method may comprise performing the reference signal sweep procedure irrespective of whether an antenna configuration has been identified in response to scheduling by a network node.

The method may comprise storing the antenna configuration for the user equipment current operating conditions identified by the reference signal sweep procedure.

The method may comprise preventing storing of the antenna configuration for the user equipment current operating conditions identified by the reference signal sweep procedure when a predetermined condition occurs.

The predetermined condition may indicate operation of the user equipment in a non-repeatable manner.

The method may comprise storing the antenna configuration using additional operating conditions when an at least partially repeatable change in condition of said user equipment is detected.

The method may comprise interpolating at least one antenna configuration for maintaining correspondence between user equipment transmission and reception beams for other user equipment operating conditions using the antenna configuration for the user equipment current operating conditions and at least one other stored antenna configuration.

The method may comprise storing interpolated antenna configurations for the other user equipment operating conditions.

The method may comprise extrapolating at least one antenna configuration for maintaining correspondence between user equipment transmission and reception beams for other user equipment operating conditions using the antenna configuration for the user equipment current operating conditions and at least one other stored antenna configuration.

The method may comprise storing extrapolated antenna configurations for the other user equipment operating conditions.

The at least one other stored antenna configuration may comprise an antenna configuration identified by the reference signal sweep procedure.

The method may comprise recursively recalculating antenna configurations for maintaining correspondence between user equipment transmission and reception beams for other user equipment operating conditions using at least one of the interpolated and extrapolated antenna configurations.

The method may comprise recursively recalculating antenna configurations for maintaining correspondence between user equipment transmission and reception beams for other user equipment operating conditions using antenna configurations identified by the reference signal sweep procedure.

The method may comprise dynamically providing an indication to a network node of whether the user equipment is able to maintain correspondence between user equipment transmission and reception beams for the user equipment current operating conditions or not.

The dynamically providing may comprise providing a change in the indication when the user equipment transitions between identifying an antenna configuration for maintaining correspondence between user equipment transmission and reception beams stored by the user equipment for the user equipment current operating conditions and not identifying an antenna configuration for maintaining correspondence between user equipment transmission and reception beams stored by the user equipment for the user equipment current operating conditions.

The dynamically providing may comprise providing the change in the indication while remaining in a radio resource control connected mode.

The indication may indicate that the user equipment is of a type which supports autonomous beam correspondence when an antenna configuration is identified for maintaining correspondence between user equipment transmission and reception beams stored by the user equipment for the user equipment current operating conditions.

The indication may indicate that the user equipment is a TS 38.101.-2 bit 1 user equipment.

The indication may indicate that the user equipment is of a type that requires network support for beam correspondence when an antenna configuration is not identified for maintaining correspondence between user equipment transmission and reception beams stored by the user equipment for the user equipment current operating conditions.

The indication may indicate that the user equipment is a TS 38.101.-2 bit 0 user equipment.

The operating conditions may comprise at least one of an operating temperature, an operating frequency, an operating bandwidth, an operating power, a modulation scheme, a proximity mismatch and an operating voltage of the user equipment.

The antenna configuration may comprise antenna weight settings.

The reference signal may comprise a sounding reference signal.

The method may be a user equipment method and/or performed at a user equipment.

According to various, but not necessarily all, embodiments of the invention there is provided a computer program comprising instructions for causing an apparatus to perform at least the following: determining, at a user equipment, user equipment current operating conditions; identifying whether an antenna configuration for maintaining correspondence between user equipment transmission and reception beams is stored by the user equipment for the user equipment current operating conditions; and when the antenna configuration is identified, applying the antenna configuration for maintaining correspondence between the user equipment transmission and reception beams.

The computer program may comprise instructions for causing an apparatus to perform the method set out above.

According to various, but not necessarily all, embodiments of the invention there is provided an apparatus, comprising: means for determining, at the apparatus comprising a user equipment, user equipment current operating conditions; means for identifying whether an antenna configuration for maintaining correspondence between user equipment transmission and reception beams is stored by the user equipment for the user equipment current operating conditions and means for applying, when the antenna configuration is identified, the antenna configuration for maintaining correspondence between the user equipment transmission and reception beams.

The apparatus may comprise means for signalling, when no antenna configuration is identified, that a reference signal sweep procedure is required to identify an antenna configuration for maintaining correspondence between user equipment transmission and reception beams for the user equipment current operating conditions.

The apparatus may comprise means for performing, when no antenna configuration is identified, a reference signal sweep procedure to identify an antenna configuration for maintaining correspondence between user equipment transmission and reception beams for the user equipment current operating conditions.

The apparatus may comprise means for performing the reference signal sweep procedure irrespective of whether an antenna configuration has been identified in response to scheduling by a network node.

The apparatus may comprise means for storing the antenna configuration for the user equipment current operating conditions identified by the reference signal sweep procedure.

The apparatus may comprise means for preventing storing of the antenna configuration for the user equipment current operating conditions identified by the reference signal sweep procedure when a predetermined condition occurs.

The predetermined condition may indicate operation of the user equipment in a non-repeatable manner.

The apparatus may comprise means for storing the antenna configuration using additional operating conditions when an at least partially repeatable change in condition of said user equipment is detected.

The apparatus may comprise means for interpolating at least one antenna configuration for maintaining correspondence between user equipment transmission and reception beams for other user equipment operating conditions using the antenna configuration for the user equipment current operating conditions and at least one other stored antenna configuration.

The apparatus may comprise means for storing interpolated antenna configurations for the other user equipment operating conditions.

The apparatus may comprise means for extrapolating at least one antenna configuration for maintaining correspondence between user equipment transmission and reception beams for other user equipment operating conditions using the antenna configuration for the user equipment current operating conditions and at least one other stored antenna configuration.

The apparatus may comprise means for storing extrapolated antenna configurations for the other user equipment operating conditions.

The at least one other stored antenna configuration may comprise an antenna configuration identified by the reference signal sweep procedure.

The apparatus may comprise means for recursively recalculating antenna configurations for maintaining correspondence between user equipment transmission and reception beams for other user equipment operating conditions using at least one of the interpolated and extrapolated antenna configurations.

The apparatus may comprise means for recursively recalculating antenna configurations for maintaining correspondence between user equipment transmission and reception beams for other user equipment operating conditions using antenna configurations identified by the reference signal sweep procedure.

The apparatus may comprise means for dynamically providing an indication to a network node of whether the user equipment is able to maintain correspondence between user equipment transmission and reception beams for the user equipment current operating conditions or not.

The means for dynamically providing may comprise means for providing a change in the indication when the user equipment transitions between identifying an antenna configuration for maintaining correspondence between user equipment transmission and reception beams stored by the user equipment for the user equipment current operating conditions and not identifying an antenna configuration for maintaining correspondence between user equipment transmission and reception beams stored by the user equipment for the user equipment current operating conditions.

The means for dynamically providing may comprise means for providing the change in the indication while remaining in a radio resource control connected mode.

The indication may indicate that the user equipment is of a type which supports autonomous beam correspondence when an antenna configuration is identified for maintaining correspondence between user equipment transmission and reception beams stored by the user equipment for the user equipment current operating conditions.

The indication may indicate that the user equipment is a TS 38.101.-2 bit 1 user equipment.

The indication may indicate that the user equipment is of a type that requires network support for beam correspondence when an antenna configuration is not identified for maintaining correspondence between user equipment transmission and reception beams stored by the user equipment for the user equipment current operating conditions.

The indication may indicate that the user equipment is a TS 38.101.-2 bit 0 user equipment.

The operating conditions may comprise at least one of an operating temperature, an operating frequency, an operating bandwidth, an operating power, a modulation scheme, a proximity mismatch and an operating voltage of the user equipment.

The antenna configuration may comprise antenna weight settings.

The reference signal may comprise a sounding reference signal.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Before discussing the example embodiments in any more detail, first an overview will be provided. Some embodiments provide an arrangement where a user equipment identifies and stores antenna configurations which provide uplink/downlink (transmission/reception) beam correspondence under different operating conditions. This enables the user equipment to select and apply those antenna configurations when operating under those operating conditions. When an operating condition is encountered for which no antenna configuration is stored, then the user equipment can trigger support from the network to feedback which antenna configuration provides adequate uplink/downlink (transmission/reception) beam correspondence under that operating condition. Storing the antenna configurations avoids the ongoing need that may otherwise occur to support procedures to ensure uplink/downlink beam correspondence under those operating conditions. Also, the user equipment may estimate (through interpolation and/or extrapolation) antenna configurations for other operating conditions not yet encountered. As the number of stored (and interpolated and/or extrapolated) antenna configurations for different operating conditions grows, the network resources required to determine an antenna configuration for different operating conditions reduces. Additionally, when the network detects that non-correspondence is occurring, the network can still instruct the user equipment to implement procedures to ensure uplink/downlink (transmission/reception) beam correspondence under its current operating conditions and overwrite any already stored antenna configuration. Furthermore, should the user equipment deduce that there is a further operating condition that is affected uplink/downlink (transmission/reception) beam correspondence which is not currently correlated with any stored antenna configuration, then antenna configurations related to that further operating condition can also be stored. The user equipment is thus able to signal dynamically to the network when it needs and does not need network resources to maintain uplink/downlink (transmission/reception) beam correspondence. This provides for a self-learning user equipment which can be deployed and learn appropriate antenna configurations in the field without needing to have been pre-provisioned with antenna configurations for expected operating conditions while avoiding an unnecessary resource drain on the network.

Uplink Beam Misalignment

Figure 1A:
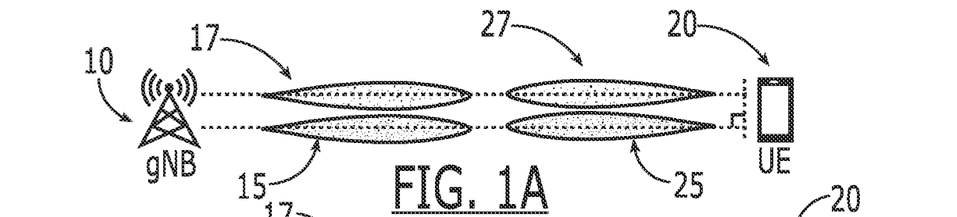
FIGS. 1A, 1B and 1C illustrate uplink/downlink beam correspondence and misalignment.
Figure 1B:
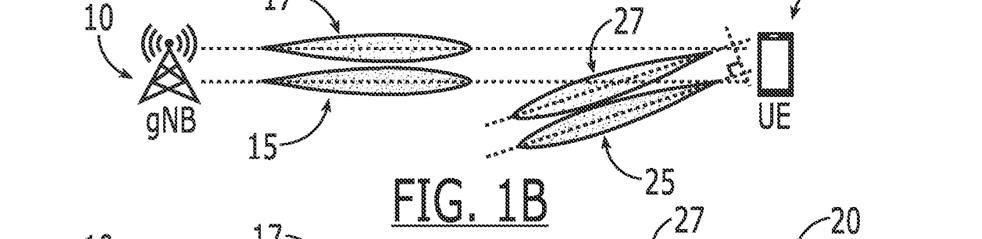
Figure 1C:
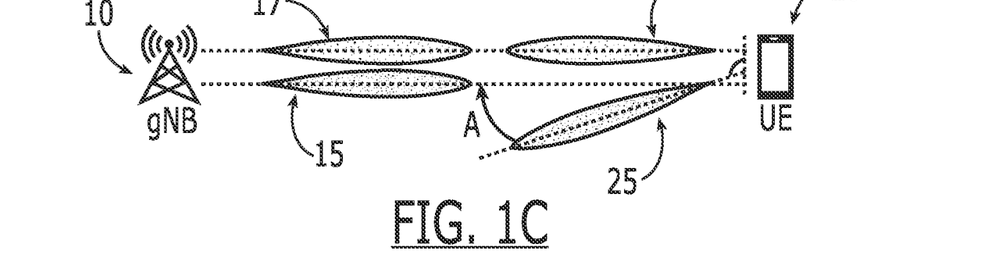

FIGS. 1A, 1B and 1C illustrates uplink/downlink beam correspondence and misalignment. A gNB 10 has an uplink beam 15 (over which transmissions from a user equipment 10 are received) and a downlink beam 17 (over which transmissions to the user equipment 10 are transmitted). The user equipment 20 has an uplink beam 25 (over which transmissions from the user equipment 10 are transmitted) and a downlink beam 27 (over which transmissions to the user equipment 10 are received).

As can be seen in FIG. 1A, the uplink beam 25 and the downlink beam 27 are in correspondence (meaning that they are aligned and parallel) and they are directed towards the corresponding uplink beam 15 and downlink beam 17.

As can be seen in FIG. 1B, the beam correspondence of the user equipment is preserved because the uplink beam 25 and downlink beam 27 are still aligned and parallel but now they are not directed towards the corresponding uplink beam 15 and downlink beam 17, which results in a suboptimal downlink and uplink with a similar reduced gain on both uplink and downlink.

FIG. 1C illustrates a misalignment between the uplink beam 25 and the downlink beam 27 because the uplink beam 25 and downlink beam 27 are no longer aligned and parallel but now the uplink beam 25 and downlink beam 27 diverge by an angle A. This misalignment can occur for a variety of reasons and can occur dynamically in the field due to, for example, impedance variation of power amplifiers, low noise amplifiers and/or switches which are affected by temperature, design tolerances, power levels of operation (which can cause small shifts), as well as power imbalances. In particular, a mismatch towards the antenna and/or towards one or more amplifier can affect the uplink and downlink directivity, whereby the beams will exhibit a different directivity towards the gNB 10. It will be appreciated that this is not limited to such occurrences and could include any type of unwanted variance of radio-frequency (RF) performance with any component(s) associated with the antenna control circuitry, receiver chain(s) and transmitter chain(s). Furthermore, if the direction of the uplink beam 25 does not correspond with the downlink beam 27 then power is not ultimately received at the gNB 10. The problem of beam misalignment is less severe for the gNB 10 than it is for the user equipment 20. This is because the freedom allocated for antenna design on the gNB 10 is significantly higher than on the user equipment 20, where the mmWave antenna arrays will have to share volume with other electrical components and antenna(s) for sub-6 GHz communication. Moreover, the user equipment 20 has a large number of constraints such as, for example, supporting a very large bandwidth for worldwide coverage, and they are often implemented with more cost-effective embedded components, thus compromising tolerance levels and resulting in impedance variations across different operational settings. Thus, the impedance (input and/or output impedance) of one or more electronic component or module within the receive and transmit chains may change and change differently across different power and gain settings which means that even balancing out the impact of any impedance mismatch helps little as the user equipment 20 adapts the closed loop power regulation of the gNB 10.

Hence, uplink/downlink beam correspondence is preserved if: Identical antenna element weights used for uplink and downlink results in identical beam gain and direction for uplink and downlink; Antenna element weights can be offset by pre-characterized values to obtain identical beam gain and direction for uplink and downlink; Two "codebooks" of beam weight vectors have been established, one for uplink and a second for downlink. Each beam weight vector in the uplink codebook is paired 1-1 with a beam weight vector in the downlink codebook such that the paired uplink and downlink beam weight vectors have identical beam and gain directions. If these are not fulfilled, then beam correspondence is broken and the uplink will be misaligned as depicted in FIG. 1C.

Figure 2:
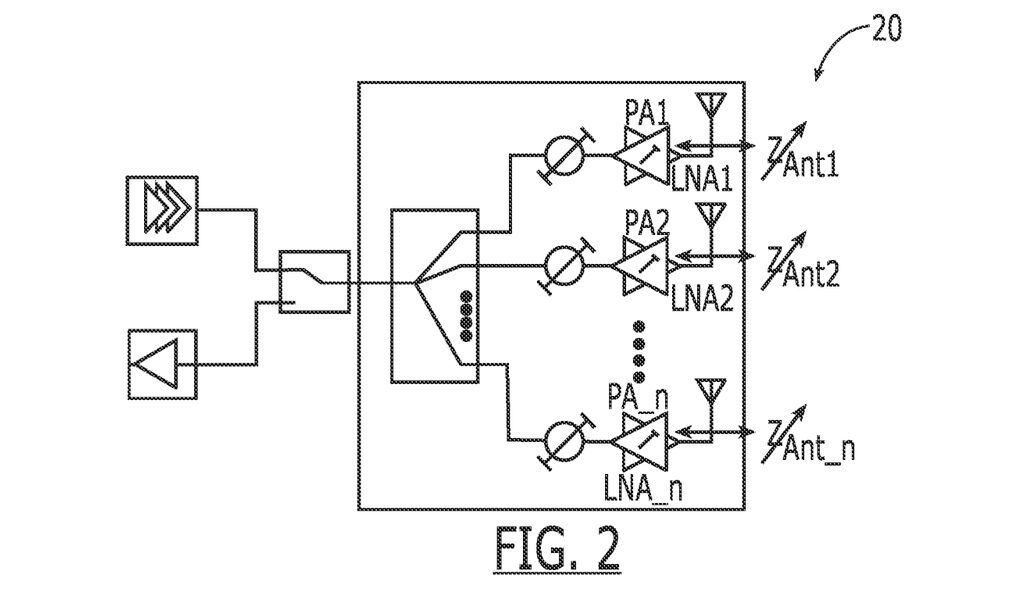
FIG. 2 is a transmit and receive simplified block diagram of the user equipment.

The impedance mismatches within the user equipment 20 can be seen in more detail in FIG. 2 which is a transmit and receive simplified block diagram of the user equipment 20 showing the different impedances towards the low noise amplifier and the power amplifier. It will be appreciated that as well as input impedance mismatches, there can be output impedance mismatches between components or modules and this difference between output and input impedances can affect power transfer between these components or modules at the frequency(ies) of interest. The impedances at the individual antenna elements in the antenna array Zant will change as a function of the required frequency and the configured angular direction of the main beam. As such, each antenna element will exhibit different impedances at any given time, which will affect the performance of the individual power amplifier(s) PA and low noise amplifier(s) (LNA) connected to that specific antenna element. A power amplifier is generally much more sensitive to changes in load impedances than a low noise amplifier, so the effects of the power amplifier load impedance changes are not captured in the beam alignment procedures, since the beam alignment procedures they rely on downlink only. The effects of the power amplifier load impedance changes would need to be part of the calibration or configuration of the transmission beam control and configuration ensure the reception and transmission beam directions are aligned upon calibration/configuration. In addition, the power amplifier misbehaviours are not only caused by the changes in load impedances but also power amplifier related factors like output power level, ambient temperature and potential gain modes. So, the actual radiation pattern formed by the antenna array will be affected by these different power amplifier and low noise amplifier misbehaviours and result in different radiation patterns for downlink and uplink, even with identical array configuration (weights). These differences in the radiation patterns can be insignificant for some array/RF front end configurations (boresight at low power) but be severe for other configurations (angular steered direction at high power) and result in beam non-correspondence, when configuration or calibration is insufficient for the state of the circuit.

Beam Alignment

For the 5G New Radio (NR) Release 15, the beam alignment procedure between the user equipment 20 and the gNB 10 is described in 3GPP TR 38.802 section 6.1.6 and in TS 38.214 section 5.2. The beam alignment procedure includes 3 main phases as described below with reference to FIG. 3.

Figure 3:
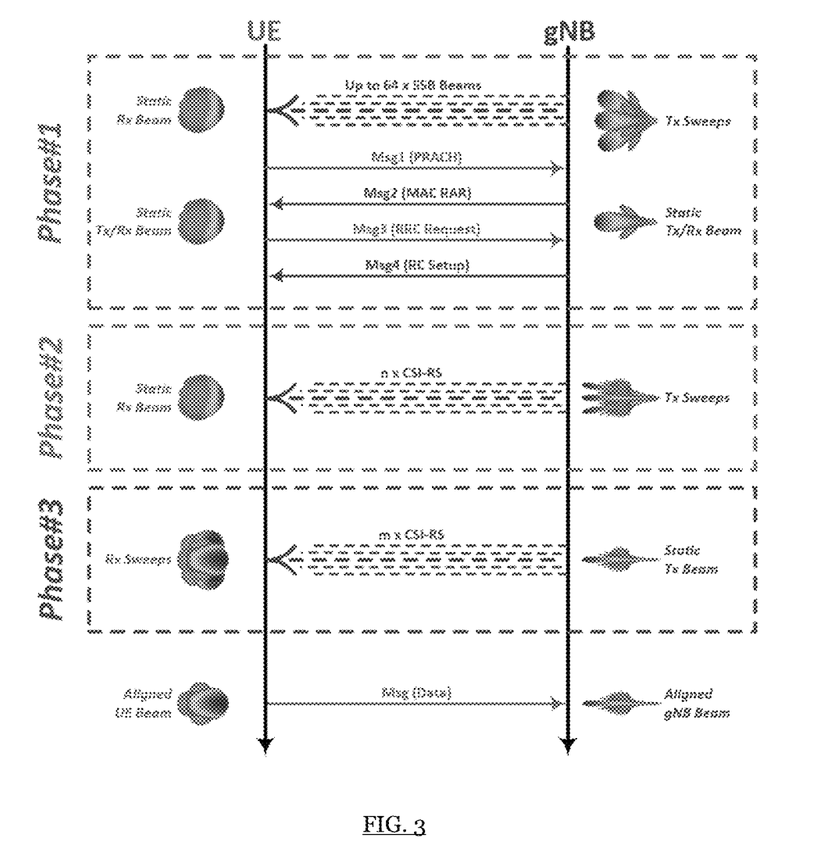
FIG. 3 illustrates a beam alignment process.

Phase #1: user equipment 20 is configured for broad beam reception while the gNB 10 is performing downlink synchronisation signal block (SSB) beam sweeping. The user equipment 20 measures the Reference Signal Received Power (RSRP) for all SSB beams received and reports back to the gNB 10 using same beam configuration as in reception, sending a suitable known signal, referred to as preamble, at a given time instance (random access channel (RACH) opportunity) as per configuration provided by gNB 10 via system information block 1 (SIB1), and decoded by the user equipment 20 upon reception of the best SSB beam (which includes the master information block (MIB), in turn including indication on the resources to be used to receive the SIB1). In connected mode, the user equipment 20 can be configured to measure set of SSBs, where the reporting is based on the level 1 (L1)-RSRP.

Phase #2: The user equipment 20 is configured for broad beam reception while the gNB 10 is performing refined downlink channel state information reference signal (DL CSI-RS) beam sweeping. The user equipment 20 selects and reports best beam identification (ID) back to the gNB 10 using same beam configuration as in reception. Selection is function of one or more metrics measured by UE, such as RSRP, channel quality indicator (CQI), rank indication (RI), just to name a few.

Phase #3: The gNB 10 transmits with best beam found in Phase #2. At this stage, and subject to specific CSI-RS resource and CSI-report configurations, the user equipment 20 may sweep refined reception beam settings for identifying the best narrow reception beam. This choice does not need to be reported to gNB 10, i.e., in this case 'reportQuantity' field of IE CSI-ReportConfig is set to 'none'. At the end of Phase #3, alignment between gNB 10 transmission beam and the user equipment 20 reception beam is obtained for maximized directional gain and minimum interference on other users in serving and neighbour cells. Note that the beam alignment procedure is based on downlink measurements only thereby assuming the transmission/reception beam correspondence is preserved at all times. Hence, uplink/downlink beam correspondence is preserved if: Identical antenna element weights used for uplink and downlink results in identical beam gain and direction for uplink and downlink; Antenna element weights can be offset by pre-characterized values to obtain identical beam gain and direction for uplink and downlink; Two "codebooks" of beam weight vectors have been established, one for uplink and a second for downlink. Each beam weight vector in the uplink codebook is paired 1-1 with a beam weight vector in the downlink codebook such that the paired uplink and downlink beam weight vectors have identical beam and gain directions. If these are not fulfilled, then beam correspondence is broken and the uplink will be misaligned as depicted in FIG. 1C.

According to TS 38.101-2, and in particular 3GPP TSG RAN WG1 Meeting #100-e R1 20000926, all user equipment 20 must support beam correspondence for frequency range 2 (FR2). Nonetheless, user equipment 20 can be categorized in [bit-1] user equipment 20 and [bit-0] user equipment 20, where:

[bit-1] user equipment 20 autonomously supports beam correspondence requirements, and

[bit-0] user equipment 20 requires additional sounding reference signal (SRS) sweeping and feedback from the network to optimally align the user equipment 20 transmission beam.

However, the beam correspondence capability specification in Rel-15/16 does not account for the dynamically changing nature of the beam correspondence state, but rather implicitly relies on a static realization of the beam correspondence itself (when supported). However, the beam correspondence state depends on the operating conditions at user equipment 20, thus it does not have a static nature in actual deployments.

In practice, maintaining a "static" beam-correspondence may lead to scheduling of SRS sweeps that are in fact not needed, hence increasing unnecessary overhead and interference and decreasing throughput. Similarly, beam noncorrespondence is more likely to occur when the user equipment 20 is operating in non-ideal conditions. In such a situation, if SRS sweeps are not scheduled often enough, a misalignment as illustrated in FIG. 1C can cause severe uplink loss.

[bit-0] user equipment 20 require SRS sweeps to align their uplink beam, however SRS sweeps are resource and time consuming and lead to throughput degradation. Moreover, they must be scheduled appropriately for each user equipment 20 and a misalignment falling into a null may cause up to 30 dB link loss, hence a possible RLF (Radio Link Failure). The severity of the problem increases as beams get narrower (or, alternatively, with the associated increased demand for high beam direction accuracy).

Parameters (operating conditions) affecting beam correspondence can be temperature, operating frequency, required antenna impedance bandwidth, power level, modulation, supply voltage and proximity mismatch, as well as some parameters specific to mmW operation such as antenna array steering angle, and the like. In addition, user-influenced parameters can affect beam correspondence such as changes due to the cover placed by the user on the user equipment 20, how the user equipment 20 is held (the user's fingers/hand/head/other body parts on or near the antenna(s) of the user equipment 20), whether the user equipment 20 is being used adjacent to or touching: metallic objects external to the user equipment 20 and/or non-metallic objects external to the user equipment 20 which are lossy at radio frequencies, and which way the user equipment 20 is oriented during use, and the like. In order to produce a [bit-1] UE, it would have to be characterized/calibrated for each permutation of the above-mentioned parameters. This number of tests would be in the order of millions (see FIG. 4) and would be required for each single user equipment 20. Therefore, characterizing/calibrating each single user equipment 20 in production to guarantee beam correspondence (i.e. being a [bit-1] UE) would entail a very long test time, thus be extremely expensive.

Figure 4:
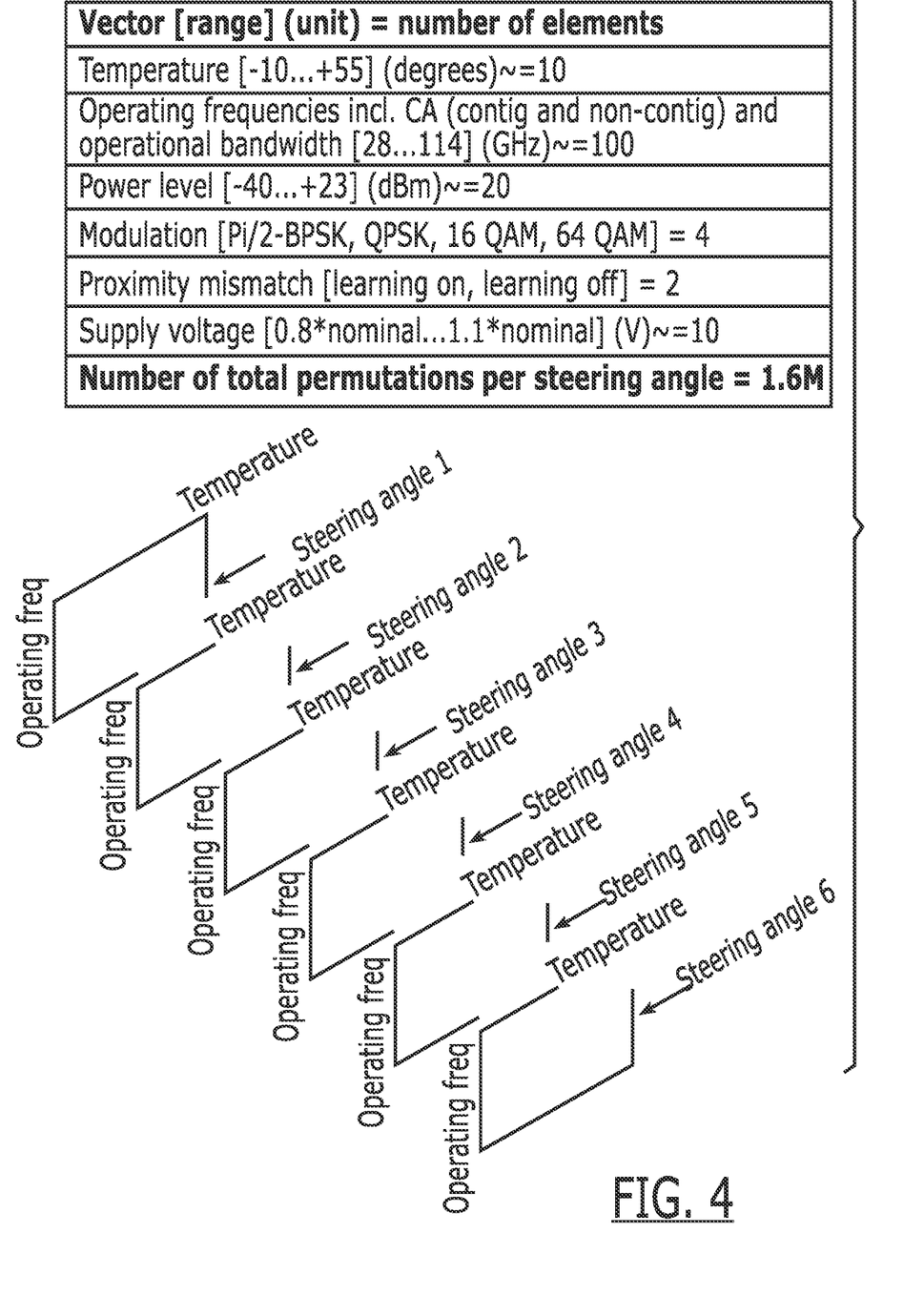
FIG. 4 lists example parameters affecting beam correspondence and illustrates schematically a subset of example tables relating parameters to antenna configuration.

The size of the problem is exemplified in FIG. 4. The number of needed over-the-air tests in a controlled environment (like an anechoic chamber) to guarantee beam-correspondence of a single user equipment 20, could easily be several millions if all permutations are included. The 1.6 million permutations shown in FIG. 4 is for one angular beam setting only, so that number must be multiplied by the number of steering angles for any mmW user equipment 20. Taking the example of a user equipment 20 with a single array of 1×4 elements for 2 polarizations (i.e. 7×2=14 beams), 22 million tests are required on a single user equipment 20 to guarantee beam-correspondence. The number of permutations increases with the array size and the number of antenna panels on the user equipment 20. Considering a user equipment 20 with 4 panels of 1×8 dual-polarized elements (i.e. 15×2×4=120 beams), the number of conditions to test would raise to 192 million, per user equipment 20. While these numbers may be high worst-case scenarios, even reducing the number of tests by only characterizing the most critical factors will still result in an unrealistically high number of over-the-air tests.

The proximity mismatch entry in the table of FIG. 4 refers to the user equipment 20 detecting a fixed load e.g. a cover placed on the user equipment by the user (which is one example of a semi-permanent change on the array impedance) and taking it into consideration in the transmission beam correction; or, detecting a user at close vicinity to the active antenna panel and turning off the learning due to the unpredictability of how the user will affect the antenna array characteristics.

Clearly, [bit-1] user equipment 20 are preferred for the network as they do not require resources allocated to SRS sweeps. Nonetheless, [bit-1] user equipment 20 are extremely expensive to produce. As such, some embodiments address how a [bit-0] user equipment 20 can transition during use in the field to become a [bit-1] user equipment 20. In other words, how can a user equipment 20 that requires SRS sweeps for its uplink beam alignment (i.e. [bit-0]) become a user equipment 20 that can autonomously align and track its UL beam (i.e. [bit-1]).

Antenna Configuration Learning for Beam Alignment

Some embodiments relate to [bit-0] user equipment 20 (which need SRS sweeps to align the transmission beam) and which have logic which learns in the field and over time, how to realign its transmission beam autonomously, thereby becoming a [bit-1] user equipment 20. As such, the user equipment 20 builds up knowledge utilizing every requested SRS sweep and maps the realigned transmission beam to the currently used reception beam.

This is not trivial as there are several internal user equipment 20 parameters that can affect beam correspondence, which may vary in unpredictable ways and the number of permutations to test per user equipment 20 may be very large, as described above.

Some embodiments store, correlate, interpolate and build knowledge for the user equipment 20 to autonomously transition from being a [bit-0] user equipment 20 (where UL SRS sweeps are needed to reach beam correspondence) to being a [bit-1] user equipment 20 (where it doesn't need the network to determine its best uplink beam). Some embodiments also return to [bit-0] in order to address new unexplored cases such as new carrier aggregation combinations.

Furthermore, the user equipment 20 may identify parameter combinations where it can behave as a [bit-1] user equipment 20 (e.g. in boresight) and others where it must build knowledge first, thereby only behave as a [bit-0] user equipment 20. This can be viewed as partial correspondence and varies depending on the current operating conditions of the user equipment 20. As such, the user equipment 20 is able to dynamically switch back-and-forth between [bit-0] and [bit-1] capability, and request SRS sweeps accordingly, using appropriate signalling.

Hence, in overview, a user equipment 20 may use on-the-fly storing of knowledge through requested SRS sweeps to become a [bit-1] beam correspondent user equipment 20, i.e. store the updated antenna weights settings (codebook) for the reconfigured transmission beam and associate to current reception beam configuration for every SRS sweep for each occurrence of beam non-correspondence that has occurred; a user equipment 20 may use on-the-fly building knowledge through requested SRS sweeps to become a [bit-1] beam correspondent user equipment 20, i.e. interpolate and extrapolate updated transmission beam configuration across different parameters even though this specific occurrence of beam non-correspondence has not yet occurred; a user equipment 20 may include new parameters affecting beam correspondence on-the-fly, e.g. specific fixed load mismatch (e.g. phone cover, new carrier aggregation/modulation and coding scheme (CA/MCS) cases downloaded over-the-air); in partial correspondence, a user equipment 20 may identify the operating conditions leading to updating the [bit-0]/[bit-1] capability, requesting the SRS sweeps, and calculating the number of SRS resources needed during the sweep.

Antenna Configuration Storage

Figure 5:
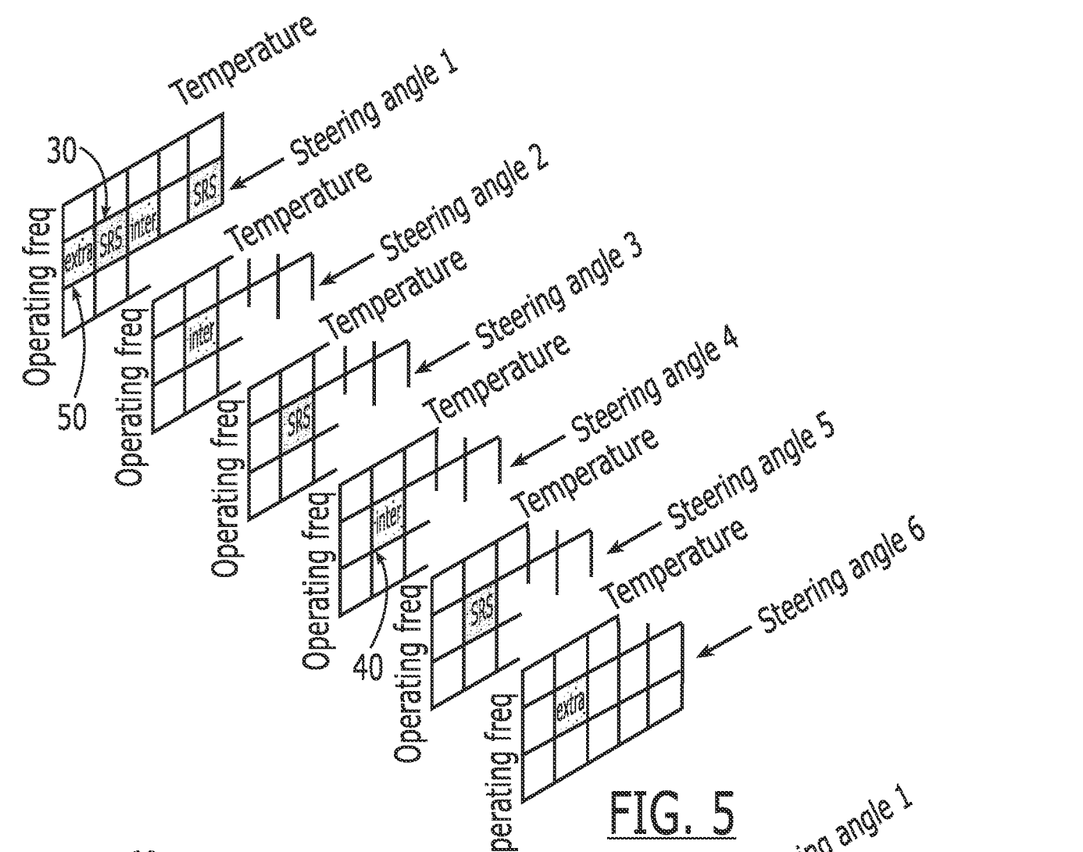
FIGS. 5 and 6 illustrates schematically the storage of antenna configuration information under different operating conditions.

FIG. 5 illustrates schematically the storage of antenna configuration information under different operating conditions (only a subset of the operating conditions are shown). In particular, FIG. 5 illustrates where, for each SRS requested by the gNB 10, the user equipment 20 identifies and stores the corresponding transmission beam configuration 30 (i.e. phase shifter and/or power level values and the like) for the maligned beam under those operating conditions. Then, the user equipment 20 can provide any interpolated transmission beam configuration 40 and/or extrapolated transmission beam configuration 50 for neighbouring operating conditions, without needing to perform an SRS sweep to establish those transmission beam configurations.

While some of the parameters affecting beam-correspondence are already identified and can be repeated to build knowledge upon them, some others result in load mismatch and are very unpredictable. This is the case for the user touching the array, where every different grip will result in a different loading of the antenna. User presence is detectable by some user equipment 20 with proximity sensors embedded on the arrays. As such, antenna loading from user presence may be a parameter used to turn off the beam-correspondence learning due to its non-repeatability (and for example always request uplink SRS sweeping). On the other hand, antenna loading may be fixed in the case of e.g. a changing phone cover. In this case, beam-correspondence learning may be updated dynamically to include this new parameter in storage.

Bit-0/Bit-1 Transitioning

User equipment 20 supporting dynamic beam correspondence means guaranteeing beam correspondence in some conditions and not in others. Two examples to illustrate this dynamic correspondence property are given below:

when the user equipment 20 is operating in boresight and ideal power and impedance conditions, beam correspondence may be guaranteed (user equipment 20 updates to [bit-1]); however as soon as the user equipment 20 rotates and needs to serve the same gNB beam with a user equipment beam steered at maximum angle, the user equipment 20 may not be able to guarantee beam correspondence and needs an SRS sweep, user equipment 20 updates to [bit-0] to adjust its transmission beam)

when the user equipment 20 is operating in boresight and ideal power and impedance conditions, beam correspondence may be guaranteed (user equipment 20 updates to [bit-1]); however as soon as the user touches the user equipment 20, the user equipment 20 may not be able to guarantee beam correspondence and needs an SRS sweep, (user equipment 20 updates to [bit-0])

Another example could be a user equipment 20 exhibiting correspondence in average PA power settings (user equipment 20 updates to [bit-1]), though in cell edge or low signal to interference plus noise ratio (SINR) the user equipment 20 needs to boost its power amplifier power to maximum values and cannot maintain beam correspondence (user equipment 20 updates to [bit-0]).

The three above examples illustrate how relevant it is to dynamically update the beam-correspondence capability of the user equipment 20. This dynamic beam correspondence user equipment 20 capability may be event-triggered RRC signalling initiated by the user equipment 20 to update the gNB 10 on current beam correspondence capability.

In time, after a certain number of SRS sweep occurrences and averaging, the user equipment 20 may update the operating conditions requiring the SRS sweep. Finally, when the user equipment 20 has obtained SRS sweep coverage across the present operating space (across the defined parameter space), it can transition from being a [bit-0] to being [bit-1] user equipment 20 and indicate the current status or any transition to the network using appropriate signalling, which enables the network to reduce the resources allocated to supporting SRS sweeping.

Figure 6:
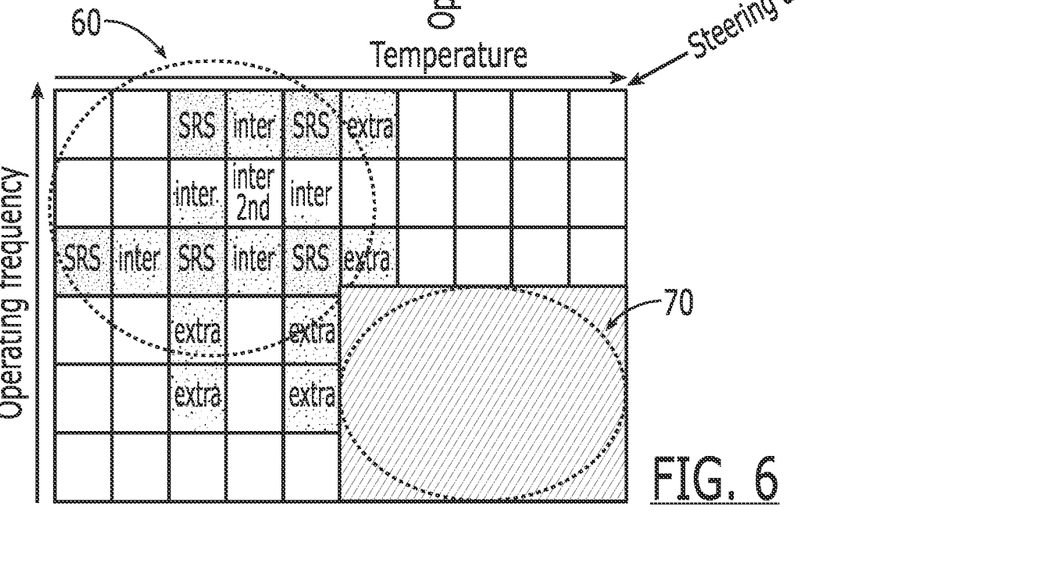

Furthermore, as illustrated in FIG. 6, the user equipment 20 can infer dynamic correspondence, also referred to as partial correspondence. That is to say, while the user equipment 20 may know that it is not fully correspondent (i.e. it is not [bit-1] because the storage tables are not full for all possible combinations), the user equipment 20 may also know that it is right now operating within parameters leading to beam-correspondence. The user equipment 20 may be operating in a characterised region 60 where it is able to guarantee beam correspondence in some specific conditions (e.g. when the user equipment 20 is operating in boresight and ideal power and impedance conditions). In such a case, the user equipment 20 may not request any SRS sweeps and update its capability to [bit-1]. In another case, the user equipment 20 may identify that it is operating in an uncharacterized region 70, where SRS sweeps are necessary to reach beam-correspondence. Therefore, the user equipment 20 may update its capability to [bit-0] and infer from the table the number of SRS sweeps requested to optimize resource allocation.

Beam Correspondence Learning

As illustrated in FIG. 6, some operating conditions have an updated user equipment 20 transmission beam configuration resulting from an SRS sweep. This stores and correlates knowledge from beam non-correspondence scenarios for those operating conditions. Based on the updated entries after SRS sweeps, the UE may interpolate and extrapolate neighbouring conditions within a confidence interval. This is building and learning towards becoming a [bit-1] user equipment 20.

Building up the beam-correspondence knowledge requires storing the adjusted settings (i.e. phase shifter and/or power level values) after each successful SRS sweep, as well as calculating the expected settings for neighbouring conditions within the confidence threshold (interpolation, second order interpolation and extrapolations). Machine learning can be used to assist in this process, as will be explained in more detail below.

Depending on the current operating conditions, the status of completeness of the correspondence procedure and the level of confidence required for guaranteeing correspondence, the user equipment 20 supports switching back and forth to [bit-0]/[bit-1] whenever the user equipment 20 finds itself outside those boundaries and thus in need of retraining.

It will be appreciated that beam correspondence learning may be performed through look-up tables and/or machine learning, depending on the complexity of the user equipment 20, the number of parameters it can sense and characterize and the processing power of the user equipment 20.

As indicated above, some embodiments store the information from on-the-field triggered SRS sweeps. This may be implemented through a look-up-table (LUT) if the number of parameters influencing beam correspondence in this specific user equipment 20 is limited. Otherwise, this may be implemented through Machine Learning (ML) if the number of parameters is very large and the user equipment 20 may benefit from a neural networks approach to enhance interpolation and extrapolation capabilities filling up the tables quickly and more accurately.

Look-Up Table

If UE beam correspondence parameters are limited to a relatively low number of the most critical parameters (e.g. power level, operating frequency, temperature), a dynamic LUT can be used to provide sensitivity across critical factors. In the case of requesting SRS sweep to the gNB 10, the combination of critical beam correspondence parameters leading to SRS sweep request are stored in a LUT. As such, the [bit-0] user equipment 20 can build up and learn the knowledge of certain combinations of critical beam correspondence parameters to be used in the case of future misalignment, as well as adjusted parameters for updating the corresponding transmission beam. If no a priori knowledge exists for the current operation settings, LUT parameters recalibration is performed, and [bit-1]-to-[bit-0] capability transmission is triggered.

Machine Learning

Figure 7:
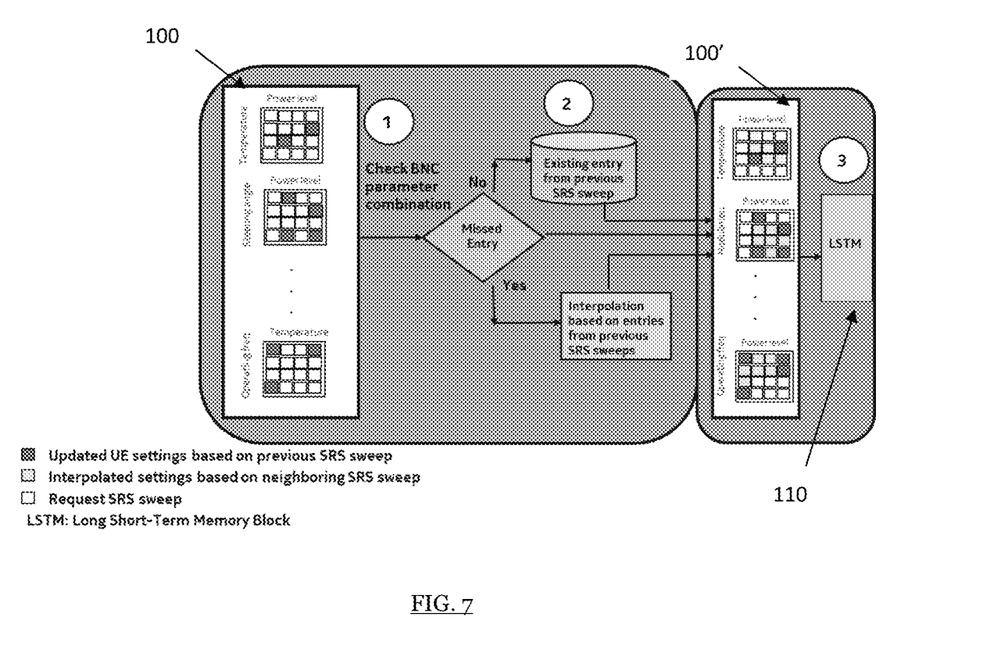
FIG. 7 illustrates a machine learning model

As illustrated in FIG. 7, to increase the robustness for a high dimensional dataset of beam correspondence parameters, a machine learning model, such as for example, a Long Short-Term Memory (LSTM) based model 110 or the like can be employed. The LSTM 110 is a special kind of Recurrent Neural Network (RNN) which can remember information for a long time. As such, to provide a learning neural network process in a longer period, the LSTM 110 can be applied.

If user equipment 20 beam correspondence parameters entail non-critical parameters as well as critical parameters an autonomous [bit-0]-to-[bit-1] approach can be alternatively employed to increase the UE knowledge towards the necessity of SRS sweep request when a high number of parameters and therefore a high number of possible combinations and permutations is considered. Moreover, an appropriate interpolation method can be applied per x parameter combinations to reduce the number of recalibrations and SRS occurrence. Training accuracy can be increased by applying the LSTM based model 110. Interpolated beam correspondence parameters and non-interpolated beam correspondence parameters are passed through a conventional LSTM neural network. As such, the accuracy of interpolated parameters increases as the training phase is completed.

The LSTM 110 is a conventional LSTM neural network. This LSTM structure is comprised of multi-dimensional input layers which are beam correspondence parameters in this case. The number of hidden layers which represents the layers of the connected neural network is dependent on the pre-defined loss function or expected prediction error.

The current operating conditions are established at block 1 and it is determined whether an entry is already stored in the dataset 100 which provides an antenna configuration which maintains beam alignment for those current operating conditions.

If that entry is not missing (meaning that an entry is already stored), then that is used by the user equipment and no SRS sweep is required. If that entry is missing then, at block 2, it is determined whether there is an interpolated/extrapolated entry having sufficient confidence in an expanded dataset 100' and, if so, then that is used by the user equipment and no SRS sweep is required. If that entry is missing and it is determined that there is no interpolated/extrapolated entry having sufficient confidence, then an SRS sweep is required and the LSTM 110 is updated with the antenna configuration for the current operating conditions.

The following summarize the proposed autonomous [bit-1] user equipment 20 LSTM based model:

1. In case of an SRS sweep occurrence, the relevant operating conditions of beam correspondence parameters that lead to requesting the SRS sweep are identified; and the corresponding user equipment 20 transmission settings are updated and stored.
2. The updated transmission beam configuration will be used to optimize the user equipment 20 performance and it will be entered to the LSTM neural network as an input layer. This condition may happen after sufficient number of SRS sweep occurrences (block 1 in FIG. 7).
3. When possible/necessary, an interpolation method (e.g. spline interpolation or linear interpolation) is applied to estimate the neighbouring entry conditions. This interpolation can be applied to any matrix representing entries for each 2 (or more) different parameters (block 3 in FIG. 7).
4. Non-interpolated, interpolated and extrapolated entries of multi-dimensional beam correspondence parameters are used as input layers of a conventional LSTM neural network.
5. As the neural network builds up its knowledge of processed training data, interpolated and extrapolated entries can be updated and predicted with more accuracy.
6. As block 3 is completed, the user equipment 20 can reduce the number of on-the-field requested SRS sweeps. It can also follow a pattern based on previous knowledge of successful/unsuocessful Tx beam configurations across different parameters. Based on the previous knowledge, a [bit-0] user equipment 20 can decide whether an SRS sweep is required.

Hence, the ISTM model optimizes SRS sweep requests with dynamic/partial correspondence.

Figure 8:
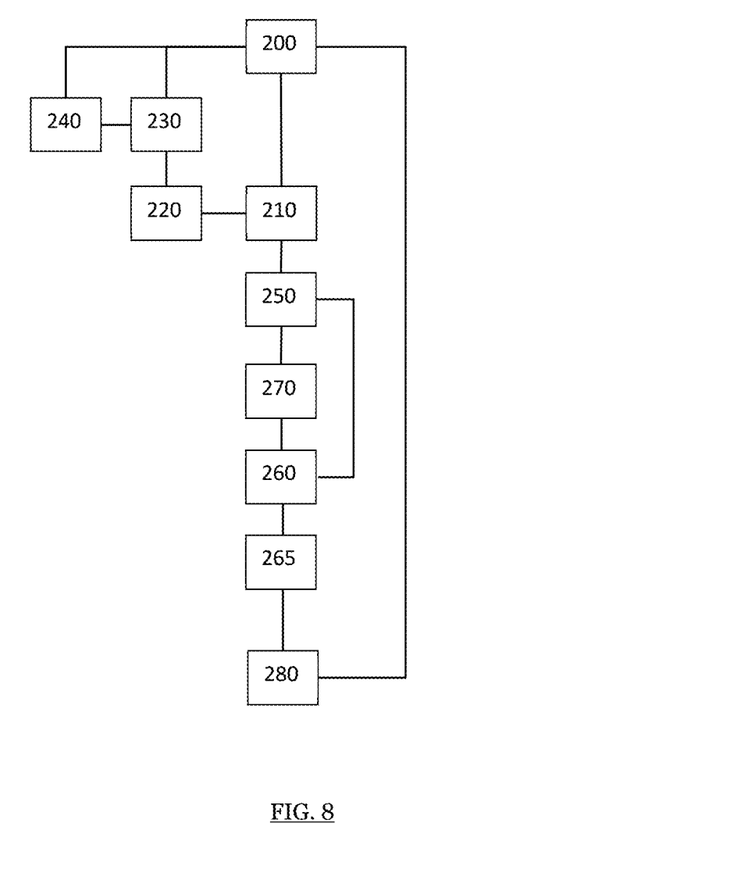
FIG. 8 illustrates schematically an example of a method performed by the user equipment.

FIG. 8 illustrates schematically an example of a method performed by the user equipment 20.

At block 200, the user equipment 20 determines its current operating conditions.

At block 210, the user equipment 20 determines whether there is an antenna configuration entry in its dataset for the current operating conditions.

If there is, then at block 220, the user equipment uses that antenna configuration.

At block 230, it is determined whether the network has already been informed that the user equipment 20 is operating as a [bit-1] user equipment 20.

If so, then processing returns to block 200.

Otherwise, at block 240 the user equipment 20 signals to the network that the user equipment 20 is operating as a [bit-1] user equipment 20 while remaining in RRC_connected mode and processing returns to block 200.

If it was determined at block 210 that the user equipment has no antenna configuration entry in its dataset for the current operating conditions, then at block 250 it is determined whether the network has already been informed that the user equipment 20 is operating as a [bit-0] user equipment 20.

If so, then processing proceeds to block 260.

Otherwise, at block 270 the user equipment 20 signals to the network that the user equipment 20 is operating as a [bit-0] user equipment 20 while remaining in RRC_connected mode and processing proceeds to block 260.

At block 260, the user equipment 20 signals to the network that it needs to perform an SRS sweep.

At block 265, the antenna configuration for the current conditions determined by the SRS sweep are applied.

At block 280, the antenna configuration for the current conditions are provided to the LSTM 110, the dataset is updated and processing returns to block 200.

The blocks illustrated in FIG. 7 may represent steps in a method and/or sections of code in a computer program. The illustration of a particular order to the blocks does not necessarily imply that there is a required or preferred order for the blocks and the order and arrangement of the block may be varied. Furthermore, it may be possible for some blocks to be omitted.

Accordingly, it can be seen that some embodiments limit SRS overhead by only identifying scenarios where beam non-correspondence is likely and learn to associate operating conditions with beam realignment, in order to reduce the need for SRS beam sweeps in time and aim at becoming a [bit-1] user equipment 20. This has the significant advantage of potentially reducing the calibration burden in user equipment 20 production since the user equipment 20 may come out of the factory only being specification-compliant, but not beam-correspondence compliant; the user equipment 20 can learn to be beam-correspondence compliant in the field (in other words, during use by a user of the user equipment); 100+ million over-the-air tests per user equipment 20 can be saved. This enables having [bit-1] user equipment 20 on the market, which would otherwise be unrealistic because of the required time and money for over-the-air testing. Both look-up-table and machine learning can be used for this procedure. Beams swept can be learned from a look-up-table or LSTM. Nonetheless, there is a significant gain in using machine learning over look-up table: with machine learning (and neural networks) the user equipment 20 can reach beam correspondence as fast as possible; the user equipment 20 can predict missing data using interpolation and an LSTM refinement in order to use interpolated data to configure its transmission beam, instead of requesting an SRS sweep; dynamic/partial beam-correspondence can be used to increase the accuracy of a SRS sweep request; the user equipment 20 can build up an SRS sweeping pattern based on the learned settings; the user equipment 20 can request a specific (reduced) amount of SRS resource to optimize resource allocation, based upon neighbouring conditions and neighbouring updated user equipment 20 transmission beam configurations.

A person of skill in the art would readily recognize that the blocks of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the blocks of said above-described methods. The program storage devices may be, e.g., digital memories, magnetic storage media such as a magnetic disks and magnetic tapes, hard drives, or optically readable digital data storage media. The embodiments are also intended to cover computers programmed to perform said blocks of the above-described methods.

A user equipment 20 can be any of: a portable electronic device, a terminal, a laptop computer, a tablet computer, a body or wrist worn electronic device, a handheld electronic navigation device, and the like, having cellular protocol capability.

Figure 9:
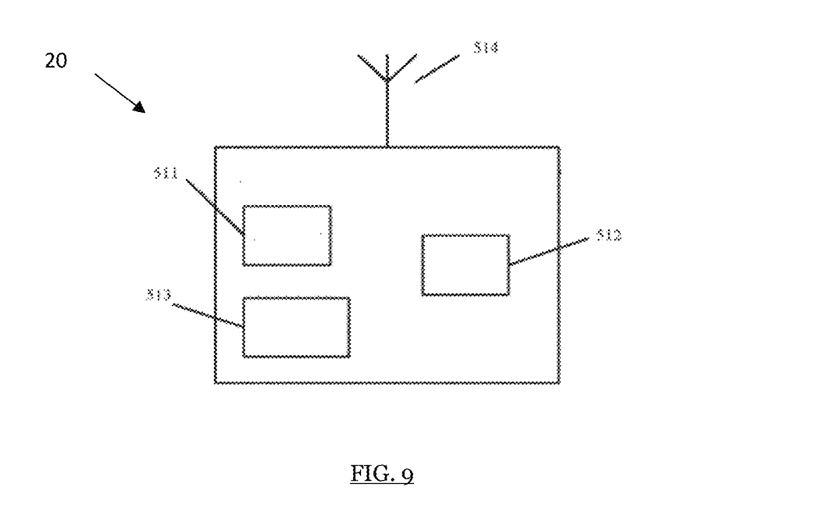
FIG. 9 illustrates some components of the user equipment 20 in more detail.

FIG. 9 illustrates some components of the user equipment 20 in more detail. It should be understood that each block in FIGS. 7-8 may be implemented by various means or their combinations, such as hardware, software, firmware, one or more processors and/or circuitry.

The user equipment 20 may include at least one processor or control unit or module 511. At least one memory 512 may be provided in each device. The memory 512 may include computer program instructions or computer code contained therein. One or more radio frequency circuitry 513 may be provided, and each device may also include an antenna 514. Although only one antenna 514 is shown, many antennas and multiple antenna elements may be provided to each of the devices. Other configurations of these devices, for example, may be provided. For example, the user equipment 20 may be additionally configured for wired communication, in addition to wireless communication, and in such a case antennas 514 may illustrate any form of communication hardware, without being limited to merely an antenna.

Radio frequency circuitry 513 may independently, be a transmitter, a receiver, or both a transmitter and a receiver, or a unit or device that may be configured both for transmission and reception.

The user equipment 20 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, the user equipment 20, may include means for carrying out embodiments described above. In certain embodiments, at least one memory 512 including computer program code can be configured to, with the at least one processor 511, cause the user equipment 20 at least to perform any of the processes described herein.

The processor 511 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processor(s) 511 may be implemented as a single controller, or a plurality of controllers or processors.

For firmware or software, the implementation may include modules or unit of at least one chip set (for example, procedures, functions, and so on). The memory 512 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory 512 and which may be processed by the processor(s) 511 can be any suitable form of computer program code, for example, a compiled or interpreted computer program written in any suitable programming language. The memory 512 or data storage entity is typically internal but may also be external or a combination thereof, such as in the case when additional memory capacity is obtained from a service provider. The memory 512 may be fixed or removable.

The memory 512 and the computer program instructions may be configured, with the processor(s) 511 to cause the user equipment 20 to perform any of the processes described above. Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware. Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method, comprising:
   determining, at a user equipment, user equipment current operating conditions, wherein the user equipment current operating conditions comprise one or more of a temperature, an operating frequency, a required antenna impedance bandwidth, a power level, a modulation, a supply voltage, or a proximity mismatch;
   identifying whether an antenna configuration for maintaining a correspondence between user equipment transmission and reception beams is stored by said user equipment for said user equipment current operating conditions;
   performing, responsive to failing to identify the antenna configuration, a reference signal sweep procedure to identify the antenna configuration for maintaining the correspondence between the user equipment transmission and reception beams for said user equipment current operating conditions, wherein the antenna configuration for one or more of the user equipment current operating conditions is updated during the reference signal sweep procedure; and
   applying, responsive to identifying the antenna configuration, said antenna configuration for maintaining the correspondence between the user equipment transmission and reception beams.

2. The method of claim 1, comprising:
   when no antenna configuration is identified to be stored by the user equipment for the user equipment operating conditions, signaling that the reference signal sweep procedure is required to identify the antenna configuration for maintaining the correspondence between the user equipment transmission and reception beams for said user equipment current operating conditions.

3. The method of claim 2, comprising storing said antenna configuration for said user equipment current operating conditions identified by said reference signal sweep procedure.

4. The method of claim 2, comprising preventing storing of said antenna configuration for said user equipment current operating conditions identified by said reference signal sweep procedure when a predetermined condition occurs.

5. The method of claim 4, wherein said predetermined condition indicates operation of the user equipment in a non-repeatable manner.

6. The method of claim 2, comprising storing said antenna configuration using additional operating conditions when an at least partially repeatable change in condition of said user equipment is detected.

7. The method of claim 2, comprising at least one of:
   interpolating at least one antenna configuration for maintaining a correspondence between user equipment transmission and reception beams for other user equipment operating conditions using said antenna configuration for said user equipment current operating conditions and at least one other stored antenna configuration; or
   extrapolating at least one antenna configuration for maintaining a correspondence between user equipment transmission and reception beams for other user equipment operating conditions using said antenna configuration for said user equipment current operating conditions and at least one other stored antenna configuration.

8. The method of claim 7, comprising storing at least one of:
   the interpolated at least one antenna configuration for said other user equipment operating conditions; or
   the extrapolated at least one antenna configuration for said other user equipment operating conditions.

9. The method of claim 7, comprising at least one of:
   recursively recalculating antenna configurations for maintaining the correspondence between the user equipment transmission and reception beams for said other user equipment operating conditions using at least one of said interpolated at least one antenna configuration or said extrapolated at least one antenna configuration; or recursively recalculating antenna configurations for maintaining the correspondence between the user equipment transmission and reception beams for said other user equipment operating conditions using the antenna configuration identified by said reference signal sweep procedure.

10. The method of claim 1, comprising dynamically providing an indication to a network node of whether said user equipment is able to maintain the correspondence between the user equipment transmission and reception beams for said user equipment current operating conditions or not.

11. The method of claim 10, wherein said dynamically providing comprises at least one of:
providing a change in said indication when user equipment transitions between identifying the antenna configuration for maintaining the correspondence between the user equipment transmission and reception beams stored by said user equipment for said user equipment current operating conditions and not identifying the antenna configuration for maintaining the correspondence between the user equipment transmission and reception beams stored by said user equipment for said user equipment current operating conditions; or
providing said change in said indication while remaining in a radio resource control connected mode.

12. The method of claim 11, wherein said indication indicates at least one of:
that said user equipment is of a type which supports autonomous beam correspondence when the antenna configuration is identified for maintaining the correspondence between the user equipment transmission and reception beams stored by said user equipment for said user equipment current operating conditions; or
that said user equipment is of a type that requires network support for a beam correspondence when the antenna configuration is not identified for maintaining the correspondence between the user equipment transmission and reception beams stored by said user equipment for said user equipment current operating conditions.

13. A non-transitory computer-readable medium comprising instructions that, when executed by a processor, cause an apparatus to perform at least the following:
determining, at a user equipment, user equipment current operating conditions, wherein the user equipment current operating conditions comprise one or more of a temperature, an operating frequency, a required antenna impedance bandwidth, a power level, a modulation, a supply voltage, or a proximity mismatch;
identifying whether an antenna configuration for maintaining a correspondence between user equipment transmission and reception beams is stored by said user equipment for said user equipment current operating conditions;
performing, responsive to failing to identify the antenna configuration, a reference signal sweep procedure to identify the antenna configuration for maintaining the correspondence between the user equipment transmission and reception beams for said user equipment current operating conditions, wherein the antenna configuration for one or more of the user equipment current operating conditions is updated during the reference signal sweep procedure; and applying, responsive to identifying the antenna configuration, said antenna configuration for maintaining the correspondence between the user equipment transmission and reception beams.

14. An apparatus, comprising:
at least one processor; and
at least one memory including computer program code configured to, when the computer program code is executed by the at least one processor, cause the apparatus to:
determine user equipment current operating conditions, wherein the user equipment current operating conditions comprise one or more of a temperature, an operating frequency, a required antenna impedance bandwidth, a power level, a modulation, a supply voltage, or a proximity mismatch;
identify whether an antenna configuration for maintaining a correspondence between user equipment transmission and reception beams is stored by a user equipment for said user equipment current operating conditions;
perform, responsive to failing to identify the antenna configuration, a reference signal sweep procedure to identify the antenna configuration for maintaining the correspondence between the user equipment transmission and reception beams for said user equipment current operating conditions, wherein the antenna configuration for one or more of the user equipment current operating conditions is updated during the reference signal sweep procedure; and
apply, responsive to identifying the antenna configuration, said antenna configuration for maintaining the correspondence between the user equipment transmission and reception beams.

15. The apparatus of claim 14, wherein the at least one memory including the computer program code is further configured to, when the computer program code is executed by the at least one processor, cause the apparatus to:
when no antenna configuration is identified to be stored by the user equipment for the user equipment operating conditions, signal that the reference signal sweep procedure is required to identify the antenna configuration for maintaining the correspondence between the user equipment transmission and reception beams for said user equipment current operating conditions.

16. The apparatus of claim 15, wherein the at least one memory including the computer program code is further configured to, when the computer program code is executed by the at least one processor, cause the apparatus to store said antenna configuration for said user equipment current operating conditions identified by said reference signal sweep procedure.

17. The apparatus of claim 15, wherein the at least one memory including the computer program code is further configured to, when the computer program code is executed by the at least one processor, cause the apparatus to prevent storing of said antenna configuration for said user equipment current operating conditions identified by said reference signal sweep procedure when a predetermined condition occurs.

18. The apparatus of claim 17, wherein said predetermined condition indicates operation of the user equipment in a non-repeatable manner.

19. The method of claim 1, further comprising:
responsive to the reference signal sweep procedure being performed, interpolating or extrapolating the antenna configuration for one or more neighboring operating conditions within a confidence interval.

* * * * *

UNITED STATES PATENT AND TRADEMARK OFFICE
CERTIFICATE OF CORRECTION

PATENT NO. : 12,245,213 B2  
APPLICATION NO. : 17/474782  
DATED : March 4, 2025  
INVENTOR(S) : Samantha Caporal Del Barrio et al.

It is certified that error appears in the above-identified patent and that said Letters Patent is hereby corrected as shown below:

On the Title Page

Item (72), Inventors, Line 3, delete "(DE);" and insert -- (DK); --, therefor.

Signed and Sealed this  
Third Day of June, 2025

Coke Morgan Stewart  
*Acting Director of the United States Patent and Trademark Office*